# (12) United States Patent
Döbler

(10) Patent No.: US 6,780,515 B2
(45) Date of Patent: Aug. 24, 2004

(54) HEAT-ABSORBING LAYER SYSTEM

(75) Inventor: Martin Döbler, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 122 days.

(21) Appl. No.: 10/117,816

(22) Filed: Apr. 8, 2002

(65) Prior Publication Data

US 2002/0182389 A1 Dec. 5, 2002

(30) Foreign Application Priority Data

Apr. 10, 2001 (DE) .......................................... 101 17 786

(51) Int. Cl.⁷ ......................... B32B 17/10; B32B 33/00; G02B 5/28
(52) U.S. Cl. ...................... 428/432; 428/412; 428/430; 428/441; 359/359; 359/360; 359/589; 264/173.11; 264/173.12; 264/173.16
(58) Field of Search .............................. 428/412, 430, 428/432, 441, 480–483; 359/356, 359–361, 580, 582, 584, 585, 588, 589; 425/547; 264/173.11, 173.12, 173.16

(56) References Cited

U.S. PATENT DOCUMENTS

| | | | |
|---|---|---|---|
| 3,591,248 A | * 7/1971 | Meunier et al. | ............. 359/360 |
| 4,504,109 A | 3/1985 | Taga et al. | ................... 350/1.6 |
| 5,108,835 A | 4/1992 | Hähnsen et al. | ............ 428/334 |
| 5,618,626 A | * 4/1997 | Nagashima et al. | ........ 428/429 |
| 5,712,332 A | 1/1998 | Kaieda et al. | ................ 524/88 |
| 5,956,175 A | * 9/1999 | Hojnowski | .................. 359/360 |
| 6,255,031 B1 | * 7/2001 | Yao et al. | ................ 430/270.1 |

FOREIGN PATENT DOCUMENTS

| | | |
|---|---|---|
| DE | 195 37 263 | 4/1997 |
| EP | 0 110 221 | 4/1987 |
| EP | 0 774 551 | 5/1997 |
| JP | 6-240146 | 8/1994 |
| JP | 10-07736 | * 3/1998 |
| JP | 10-77360 | 3/1998 |
| WO | 97/01440 | 1/1997 |
| WO | 97/01778 | 1/1997 |
| WO | 99/36808 | 7/1999 |

OTHER PUBLICATIONS

Chem. Rev. (month unavailable) 1992, 92, pp. 1197–1226, "Near–Infrared Absorbing Dyes", Jürgen Fabian, Hiroyuki Nakazumi and Masaru Matsuoka.
Patent Abstracts of Japan vol. 1998, No. 08, Jun. 30, 1998 & JP 10 077360 A (Nippon Shokubai Co Ltd), Mar. 24, 1998 in der Anmeldung erwähnt Zusammenfassung.

* cited by examiner

Primary Examiner—Deborah Jones
Assistant Examiner—G. Blackwell-Rudasill
(74) Attorney, Agent, or Firm—Joseph C. Gil; Aron Preis

(57) ABSTRACT

A heat-absorbing system comprising at least a first layer (A) containing a ultraviolet absorber, a second layer (B) containing an organic infrared absorber and ultraviolet absorber and a third, interference layer (C) reflecting in the infrared range is disclosed. The system is suitable for shielding plastic glazing elements from heat radiation.

20 Claims, No Drawings

HEAT-ABSORBING LAYER SYSTEM

FIELD OF THE INVENTION

The invention relates to a heat-absorbing layer system and more particularly to a multi-layered system to the use thereof and to products manufactured therefrom.

SUMMARY OF THE INVENTION

A heat-absorbing system comprising at least a first layer (A) containing a ultraviolet absorber, a second layer (B) containing an organic infrared absorber and ultraviolet absorber and a third, interference layer (C) reflecting in the infrared range is disclosed. The system is suitable for shielding plastic glazing elements from heat radiation.

BACKGROUND OF THE INVENTION

In automobile construction, thermoplastic glazing materials instead of glass are desired for safety reasons such as, for example, a high level of safety in the event of traffic accidents, but also for reasons of greater design freedom. A problem of using transparent thermoplastics for glazing elements in automobile construction is the excessive transmission in the near infrared (NIR) which, in summer, may lead to undesirably strong heating of the passenger compartment.

For applications in the automotive glazing sector, transmission in the visible range (LTA value) of at least 70% is specified for most cases. This value is defined in SAE J 1796 (May 1995 edition).

The TDS value (Solar Direct Transmittance) in accordance with SAE J 1796, May 1995 edition, is used for the efficiency of heat absorption. The value describes the percentage of solar energy that penetrates the sample and thus contributes to heating the vehicle interior. The higher the TDS value, the worse the heat-deflecting properties of the system.

Various heat-deflecting systems which have low transmission in the NIR have been described in the literature. On the one hand, surface coatings or lacquer systems are known, on the other hand, there are also infrared-absorbing additives for transparent thermoplastic polymers.

Infrared absorbers which are used as additives to thermoplastics and restrict heating are described, for example, in J. Fabian, H. Nakazumi, H. Matsuoka, Chem. Rev. 92, 1197 (1992), U.S. Pat. No. 5,712,332 and JP 06240146 A). A disadvantage of such additives is the limited heat shielding and/or the low thermal and/or photochemical stability thereof.

Metallized films which are bonded with the transparent thermoplastic material of the glazing element are also known as NIR protection. Such films are available commercially, for example, under the name Scotchtint® from 3M. A disadvantage of such a system, however, is that the transmission in the visible range is too low. An LTA value of more than 70% with simultaneously good heat protection (TDS value <50%) cannot be achieved with this system.

Finally, films which have NIR-reflecting properties due to interference effects are known. Such films and the use thereof as heat-absorbing layer systems for transparent thermoplastic glazing elements are described, for example, in WO 97/01778 and WO 97/01440. Films of this kind are available commercially, for example, under the name "Solar Reflecting Film, N-NPE 1458LP" from 3M. Again, a disadvantage of such systems, however, is that too small a proportion of the solar thermal radiation is screened and the TDS values of the glazing elements provided with such films are too high.

Apart from the required spectral properties, it is also necessary for exterior applications for the heat-absorbing systems to have good long-term weathering resistance, i.e., good long-term light resistance to discoloration and fading.

Thin, film-like, heat-absorbing layer systems which contain (A) a phthalocyanine infrared absorber and (B) an ultraviolet absorber are described in JP 10-077360 A. The weathering resistance of the thermal insulation layer is said to be thereby improved. According to one embodiment, a film-like coating layer with a thickness of 0.13 mm is proposed which contains both phthalocyanine infrared absorber and ultraviolet absorber. A coating layer of this kind exhibits acceptable weathering resistance in 48 hour accelerated weathering tests but a disadvantage is the poor long-term weathering resistance in weathering tests of more than 500 hours. Moreover, the thin, film-like coating layers described in this publication exhibit inadequate optical properties and are therefore unsuitable for use in automotive glazing.

It is also generally known that certain thermoplastics may be protected by the use of UV-absorbing lacquers and/or coextruded layers with a high UV absorber content. It is known, for example, from EP 0 110 221 A, to improve the weathering resistance of polycarbonate plastic panels by coating with a layer containing 3 wt. % to 15 wt. % of a UV absorber. The multi-layer systems described in this document do not contain an infrared absorber.

Finally, EP 0 774 551 A describes heat filters based on inorganic pigments which contain a UV-absorbing protective layer. Inorganic pigments have the disadvantage that they do not dissolve in thermoplastics so that no molded articles which are transparent in the visible range and have little haze are obtained.

The object of the invention is to provide a heat-absorbing layer system which has outstanding long-term weathering resistance and excellent optical properties such as transparency and gloss with the simplest and most economical mode of production possible, and which may be used for thermal insulation of transparent plastics glazing elements. The heat-absorbing coating system has a balanced ratio of LTA and TDS values, determined in accordance with SAE J 1796. More particularly, the heat-absorbing coating systems has a TDS value of less than 50% and LTA value of more than 70%.

The object according to the invention is achieved by a transparent heat-absorbing layer system which contains a first layer (A), a second layer (B) and a third layer (C) and wherein layer (A) contains ultraviolet absorber, layer (B) contains organic infrared absorber and ultraviolet absorber, and layer (C) is an interference layer reflecting in the infrared range.

The heat-absorbing layer system according to the invention is characterized by a three-layer structure in which heat absorption takes place both by means of the interference layer (C) and by means of a layer (B) containing organic infrared absorber and ultraviolet absorber. Moreover, the layer system according to the invention contains a further layer (A) with additional ultraviolet absorber which protects the infrared absorber contained in layer (B) from decomposition due to solar radiation.

Surprisingly, it was found that the layer system according to the invention has excellent weathering resistance in addition to a particularly balanced ratio of LTA and TDS values. The layer systems according to the invention have good transparency with an LTA value of >70% and good heat absorption with TDS values of less than 50%. Moreover, the layer systems according to the invention are characterized by their excellent long-term weathering resistance which makes them particularly suitable for use as glazing elements for exterior applications.

Layer (B) of the layer system according to the invention contains both organic infrared absorber and ultraviolet absorber. Due to the presence of both additives in the same layer, a large proportion of the sensitive organic infrared absorber is protected from UV radiation. In addition, the organic infrared absorber is protected from decomposition by UV radiation by a further layer containing ultraviolet absorber (layer A, "UV layer"). As the UV layer (layer A) is designed, i.a. to protect NIR dye in layer (B) from UV rays, it is advantageous to arrange layer (A) in the direction of the incident light radiation above layer (B).

The interference layer (C) of the layer system according to the invention is an interference layer reflecting in the near infrared range. Interference layers (C) suitable according to the invention include, for example, selectively reflecting alternating layer systems which contain at least two transparent layers (C1) and (C2) with different refractive indices. Suitable alternating layer systems are systems comprising several layers ("quarterware-layers") with different refractive index. According to the known laws of optics it is possible to create systems which selectively reflect near infrared light. In one embodiment of the invention the alternating layer systems comprise alternating layers of thermoplastic plastic materials. These systems can be produced by coextrusion. Another embodiment of the invention are alternating layers comprising layers of metals, layers of metal oxides and metal nitride layers.

Metal oxide layers can be present instead of or additionally to the metal nitride layers.

Alternating layers of thermoplastic plastic materials are preferred because of their good producing properties.

The commercially available film "Solar reflecting film N-NPE 1458 LP" (3M company) is a preferred embodiment of the invention.

Starting with (A), the side facing the incident light radiation, the following layer structure of the layer system according to the invention is advantageous:

layer (A)-layer (B)-layer (C) or
layer (A)-layer (C)-layer (B).

In this case, it is particularly advantageous if layer (A) is designed as a lacquer or as a polymeric resin layer and layer (B) is designed as a polymeric resin layer.

According to a preferred embodiment of the invention, the layer system according to the invention also comprises a substrate (S) based on glass or a transparent thermoplastic polymer. A substrate (S) based on polycarbonate or polyester carbonate is particularly preferred. In this case, the layer system according to the invention, starting with the side (A), facing the incident light radiation, preferably has the following layer structure:

layer (A)-layer (B)-substrate (S)-layer (C) or
layer (A)-substrate (S)-layer (B)-layer (C) or
layer (A)-substrate (S)-layer (C)-layer (B) or
layer (A)-layer (C)-substrate (S)-layer (B) or
layer (A)-layer (B)-layer (C)-substrate (S) or
layer (A)-layer (C)-layer (B)-substrate (S).

More particularly preferably, the layer system according to the invention, starting with the side (A) facing the incident light radiation, has the following layer structure:

layer (A)-layer (B)-substrate (S)-layer (C) or
layer (A)-substrate (S)-layer (B)-layer (C).

If layer (B) is designed as substrate (S), layer (B) preferably has a thickness of 1 mm to 30 mm, particularly 2 mm to 8 mm, most preferably 3 mm to 5 mm.

It is also advantageous if layer (A) or layer (B) is designed as substrate (S). It is more particularly preferred if layer (B) is designed as substrate (S).

Moreover, it was found that it is advantageous if the individual layers of the layer system according to the invention are designed in certain thicknesses.

Layers (A) and (B) preferably each have a thickness of 1 $\mu$m to 100 $\mu$m. They may be designed as a lacquer or as a coextruded layer. In the former case, the layer preferably has a thickness of 3 $\mu$m to 5 $\mu$m, in the latter case a thickness of 30 $\mu$m to 80 $\mu$m. If layer (A) or (B) is designed as a substrate (S), this preferably has a thickness of 1 mm to 30 mm, particularly 3 mm to 5 mm.

Layer (C) preferably has a thickness of 0.1 $\mu$m to 200 $\mu$m. It is designed preferably as a film.

The substrate (S) preferably has a thickness of 1 mm to 30 mm, particularly 3 mm to 5 mm.

The layer system according to the invention has excellent transparency and haze behaviour as well as outstanding long-term weathering resistance. More particularly, it is characterized in that it has, in addition to a TDS value of less than 50%, an LTA value of more than 70%. Both from a production standpoint and in terms of specific properties for use in automotive glazing, it has proved to be particularly advantageous if the NIR/UV layer (layer B) and the UV layer (layer A) are designed as coextruded polymer layers in the appropriate thicknesses.

According to a preferred embodiment of the invention layer (B), is the only layer in the layer system to contain organic IR absorbers.

According to a further preferred embodiment of the invention, the layer system according to the invention contains, in addition to layers (A), (B) and (C), at least one further transparent layer (D) which preferably contains neither an organic infrared nor an ultraviolet absorber. Layer (D) is also called a "clear layer" and its purpose is to improve the mar resistance or to increase the mechanical stiffness. One or more clear layers may be present in the layer system according to the invention. The use of 1 to 3 clear layers, particularly preferably 1 clear layer, is preferred. The clear layers may be arranged in any place in the layer system, i.e. above, below and/or between the layers (A), (B) and (C). A layer system in which the clear layer (D) is arranged as the uppermost layer, relative to solar irradiation is, however, particularly advantageous. There are no particular restrictions with regard to the material of clear layer (D); as a rule, however, it is advantageous for the clear layer to be designed as a polymer or glass layer. Suitable polymer layers include, in particular, layers of transparent thermoplastics. Particularly suitable transparent thermoplastics are polycarbonates or copolycarbonates. It is advantageous for the optical properties of the layer system if the same polymer is used in layer (D) as in the other layers. In the case of a layer system according to the invention in which layers (A) and/or (B) are, for example, layers based on polycarbonate, it is advantageous if layer (D) is also a layer based on polycarbonate.

Layer (D) may be designed as a lacquer or as a coextruded layer. In the former case, layer (D) preferably has a thickness of 0.1 μm to 30 μm, particularly 0.3 μm to 10 μm. In the latter case, layer (D) preferably has a thickness of 0.01 mm to 30 mm, particularly 3 mm to 5 mm.

Organic infrared absorbers which are suitable for use in the layer system according to the invention are compounds which have the highest possible absorption between 700 nm and 1500 nm (near infrared=NIR). Suitable infrared absorbers are described in, e.g., M. Matsuoka, Infrared Absorbing Dyes, Plenum Press, New York, 1990, incorporated herein by reference. Particularly suitable infrared absorbers are phthalocyanines, naphthalocyanines, metal complexes, azo dyes, anthraquinones, squaric acid derivatives, immonium dyes, perylenes and polymethines. Of these, phthalocyanines and naphthalocyanines are more particularly suitable. In view of the improved solubility in thermoplastics, phthalocyanines and naphthalocyanines with bulky side groups are preferred.

There are no particular restrictions as regards the amount of organic infrared absorber contained in layer (B), provided that the desired absorption of thermal radiation and a sufficient transparency of the layer system are attained. It has proved to be particularly advantageous if layer (B) contains organic infrared absorber in an amount of 0.001 to 10 g/m$^2$, particularly 0.1 to 1 g/m$^2$. Depending on the extinction coefficient and layer thickness of the NIR/UV layer (layer B), the infrared absorbers are used preferably in concentrations from 1 ppm to 10,000 ppm, preferably from 10 ppm to 1,000 ppm and more particularly preferably from 20 ppm to 400 ppm. Mixtures of infrared absorbers are also particularly suitable. The skilled person may achieve optimum absorption in the near infrared range with dyes of different wave lengths of the absorption maxima.

Ultraviolet absorbers suitable for use in the layer system according to the invention are compounds which have the lowest possible transmission below 400 nm and the highest possible transmission above 400 nm. Suitable absorbers have a maximum of absorption between 280 and 370 nm, preferably between 320 and 350 nm. Such compounds and the preparation thereof are known and are described, for example, in EP 0 839 623 A, WO 96/15102 and EP 0 500 496 A which are incorporated herein by reference. Ultraviolet absorbers which are particularly suitable for use in the layer system according to the invention are benzotriazoles, triazines, benzophenones and/or arylated cyanoacrylates.

Particularly suitable ultraviolet absorbers are hydroxy benzotriazoles such as 2-(3',5'-bis-(1,1-dimethylbenzyl)-2'-hydroxyphenyl)-benzotriazole (Tinuvin® 234, Ciba Spezialitätenchemie, Basel), 2-(2'-hydroxy-5'-(tert.-octyl)-phenyl)-benzotriazole (Tinuvin® 329, Ciba Spezialitätenchemie, Basel), 2-(2'-hydroxy-3'-(2-butyl)-5'-(tert.-butyl)-phenyl)-benzotriazole (Tinuvin® 350, Ciba Spezialitätenchemie, Basel), bis-(3-(2H-benztriazolyl)-2-hydroxy-5-tert.-octyl)methane, (Tinuvin® 360, Ciba Spezialitätenchemie, Basel), 2-(hydroxy-2-hydroxyphenyl)4,6-diphenyl-1,3,5-triazine (Tinuvin® 1577, Ciba Spezialitätenchemie, Basel) and benzophenone 2,4-dihydroxybenzophenone (Chimasorb22®, Ciba Spezialitätenchemie, Basel), 2-propenoic acid, 2-cyano-3,3-diphenyl-, 2,2-bis[[2-cyano-1-oxo-3,3-diphenyl-2-propenyl)oxy]methyl]-1,3-propanediylester (9Cl) (Uvinul® 3030, BASF AG Ludwigshafen). Mixtures of these ultraviolet absorbers may also be used.

Nanoscale inorganic UV absorbers with or without organic UV absorbers may also be used. $TiO_2$, ZnO and $CeO_2$ are preferred. The size of these particles is less than 100 nm: their preparation is known.

There are no particular restrictions with regard to the amount of ultraviolet absorber contained in the layer system.

According to a preferred embodiment of the invention, layer (A) contains ultraviolet absorber in an amount of 0.1 wt. % to 40 wt. %, particularly 1 wt. % to 10 wt. %. Moreover, it has proved to be advantageous if layer (B) contains ultraviolet absorber in an amount of 0.1 wt. % to 10 wt. %, particularly 0.2 wt. % to 1 wt. %.

There are no particular restrictions with regard to the base material for layers (A), (B) and (C), (D) and (S), provided that the material has good transparency and weathering resistance and is thus suitable for use in automotive glazing. It has proved to be particularly advantageous, however, if the individual layers of the layer system are layers based on polymers or lacquers. This means that the organic infrared absorbers and/or ultraviolet absorbers, if contained in the individual layers, are introduced into a polymer or lacquer layer.

The use of transparent thermoplastic polymers is preferred.

Transparent thermoplastic polymers within the meaning of the invention include, e.g., polymers of ethylenically unsaturated monomers and/or polycondensates of bifunctional reactive compounds. Examples of transparent thermoplastic polymers include polycarbonates or copolycarbonates based on diphenols, poly- or copolyacrylates and poly- or copolymethacrylate such as, e.g., poly- or copolymethylmethacrylates and copolymers with styrene such as, e.g., transparent polystyrene acrylonitrile (PSAN) or polymers based on ethylene and/or propylene, and aromatic polyesters such as PET, PEN or PETG and transparent thermoplastic polyurethanes. Moreover, polymers based on cyclic olefins (e.g. TOPAS®, a commercial product of Ticona), poly- or copolycondensates of terephthalic acid such as, e.g., poly- or copolyethylene terephthalate (PET or CoPET) or PETG may also be incorporated.

Mixtures of several transparent thermoplastic polymers are also suitable.

Polycarbonates or copolycarbonates are preferred.

Particularly preferred polycarbonates are the homopolycarbonate based on bisphenol A, the homopolycarbonate based on 1,3-bis-(4-hydroxyphenyl)3,3,5-trimethylcyclohexane and the copolycarbonates based on both monomers bisphenol A and 1,1-bis-(4-hydroxyphenyl)-3,3,5-trimethylcyclohexane.

Polycarbonates within the meaning of the present invention are both homopolycarbonates and copolycarbonates; the polycarbonates may be linear or branched, in the known way.

The polycarbonates are prepared in the known manner from diphenols, carbonic acid derivatives, optionally chain terminators and branching agents.

Details about the preparation of polycarbonates have been recorded in many patents for about 40 years. Reference will be made here by way of example only to Schnell, "Chemistry and Physics of Polycarbonates", Polymer Reviews, volume 9, Interscience Publishers, New York, London, Sydney 1964, D. Freitag, U. Grigo, P. R. Müller, H. Nouvertne', BAYER AG, "Polycarbonates" in Encyclopedia of Polymer Science and Engineering, volume 11, second edition, 1988, pages 648–718 and finally to Dres. U. Grigo, K. Kirchner and P. R. Müller, "Polycarbonates" in Becker/Braun, Kunststoff-Handbuch, vol. 3/1, Polycarbonates, Polyacetals, Polyesters, Cellulose esters, Carl Hanser Verlag Munich, Vienna 1992, pages 117–299.

Diphenols suitable for the preparation of polycarbonates include, for example, hydroquinone, resorcinol, dihydroxydiphenyls, bis-(hydroxyphenyl)-alkanes, bis (hydroxyphenyl)-cycloalkanes, bis-(hydroxyphenyl)- sulfides, bis-(hydroxyphenyl)-ethers, bis-(hydroxyphenyl)-ketones, bis-(hydroxyphenyl)-sulfones, bis-(hydroxyphenyl)-sulfoxides, α-α'-bis-(hydroxyphenyl)-diisopropylbenzenes, and the compounds thereof alkylated and halogenated on the nucleus.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

These and other suitable diphenois are described, e.g., in U.S. Pat. No. 3,028,635, U.S. Pat. No. 2,999,825, U.S. Pat. No. 3,148,172, U.S. Pat. No. 2,991,273, U.S. Pat. No. 3,271,367, U.S. Pat. No. 4,982,014 and U.S. Pat. No. 2,999,846, in DE-A 1 570 703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964", and in JP-A 62039/1986, JP-A 62040/1986 and JP-A 105550/1986.

In the case of homopolycarbonates, only one diphenol is used, and in the case of copolycarbonates several diphenols are used.

Examples of suitable carbonic acid derivatives include phosgene or diphenylcarbonate.

Suitable chain terminators which may be used in the preparation of polycarbonates include both monophenols and monocarboxylic acids. Suitable monophenols are phenol itself, alkyl phenols such as cresols, p-tert/-butylphenol, p-n-octylphenol, p-iso-octylphenol, p-n-nonylphenol and p-iso-nonylphenol, halogenated phenols such as p-chlorophenol, 2,4-dichlorophenol, p-bromophenol and 2,4,6-tribromophenol, 2,4,6-triiodophenol, p-iodophenol, and mixtures thereof.

A preferred chain terminator is p-tert.-butylphenol and phenol.

Suitable monocarboxylic acids are also benzoic acid, alkylbenzoic acids and halogenated benzoic acids.

Preferred chain terminators include phenols corresponding to formula (I)

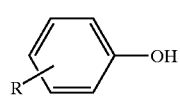

(I)

wherein
R is hydrogen or a $C_1$ to $C_{30}$ alkyl radical, is linear or branched, is preferably tert.-butyl or a branched or unbranched $C_8$ and/or $C_9$ alkyl radical.

The amount of chain terminator to be used is preferably 0.1 mole % to 5 mole %, based on moles of diphenols used in each case. The addition of chain terminators may take place before, during or after phosgenation.

Suitable branching agents are the tri- or more than trifunctional compounds known in polycarbonate chemistry, particularly those with three or more than three phenolic OH groups.

Suitable branching agents include, for example, phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4"-dihydroxytriphenyl)-methyl)-benzene, and 2,4-dihydroxybenzoic acid, trimesic acid, cyanuric chloride and 3,3-bis-(3-methyl-4-hydroxyphenyl)-2-oxo-2,3-dihydroindole.

The amount of branching agents optionally to be used is preferably 0.05 mole % to 2 mole %, again based on moles of diphenols used in each case.

The branching agents may be charged either with the diphenols and the chain terminators in the aqueous alkaline phase, or dissolved in an organic solvent and added before phosgenation. In the case of the transesterification process, the branching agents are used together with the diphenols.

The compositions according to the invention may also contain conventional polymer additives, such as, e.g., the antioxidants and mold release agents described in EP-A 0 839 623, WO 96/15102 and EP-A 0 500 496, as well as flame retardants, glass fibers, fillers, foaming agents, pigments, optical brighteners or dyes known from the literature and in the amounts conventionally used for the thermoplastics in each case. Amounts of up to 5 wt. % in each case are preferred, preferably 0.01 wt. % to 5 wt. %, based on the amount of the compositions, particularly preferably 0.01 wt. % to 1 wt. %, based on the amount of the compositions. Mixtures of several additives are also suitable.

Ions that may be present as an impurity in the thermoplastic polycarbonates are preferably in amounts of less than 10 ppm, particularly preferably less than 5 ppm.

The expert is familiar with the procedures for the preparation of the thermoplastic polycarbonates.

In the case of several thermoplastic layers, the thermoplastics may be of different types or of the same type.

Suitable molded articles/protective layer combinations are given, for example, in EP 0 320 632 A, incorporated herein by reference. The same types of plastics are preferred.

Lacquer systems suitable for use in the layer system according to the invention are those of which the crosslinking components contain acrylate, allyl, epoxy, siloxane, isocyanate, anhydride and/or melamine formaldehyde functions. Comprehensive descriptions of such lacquer systems may be found in: "Lehrbuch der Lacke und Beschichtungen", editor: Dr. Hans Kittel, Verlag Hirzel, Stuttgart, 1998; in "Lackkunstharze" by Hans Wagner, Hans Friedrich Sarx, Carl Hanser Verlag Munich, 1971; particularly for epoxy resins in "Epoxy Resins, Chemistry and Technology", edited by Clayton A. May and Yoshio Tanaka, Marcel Dekker, Inc., New York, 1973, chapter 7, pages 451 ff, all incorporated herein by reference.

Siloxane lacquers of the kind described, e.g., in DE 4020316 A incorporated herein by reference are particularly preferred.

The thickness of the lacquer layers is 1 μm to 200 μm, preferably 2 μm to 50 μm and more particularly preferably 2 μm to 10 μm. The viscosity of the lacquer is preferably 5 mPa.s to 10,000 mPa.s.

Optionally, the polymers or lacquers used in the layers (A), (B), (C), (D) and/or (S) may contain further additives such as, e.g., the antioxidants, flame retardants, fillers, foaming agents, conventional dyes and pigments, optical brighteners and nucleating agents or the like described in EP 0 839 623 A1 and EP 0 500 496 A1, preferably in amounts of up to 5 wt. % in each case, preferably 0.01 wt. % to 5 wt. %, based on the total mixture, particularly preferably 0.01 wt. % to 1 wt. %, based on the amount of plastic. Mixtures of said additives are also suitable.

Moreover, the thermoplastics may also contain conventional heat stabilisers. Particularly suitable heat stabilisers according to the invention include hindered phenols, for example, octadecyl-3-(3',5'-di-tert.-butyl-4'-hydroxyphenyl)-propionate (Irganox® 1076, Ciba Specialty Chemicals, Basel, Switzerland). Moreover, particularly suitable heat stabilisers according to the invention include phosphites, particularly tris(2,4-di-tert.-butyl-phenyl)-phosphite (Irgafos® 168, Ciba Specialty Chemicals, Basel, Switzerland) or phosphines such as, e.g., triphenylphosphine.

The thermoplastics of the layer system according to the invention may also contain conventional mold release agents. Particularly suitable mold release agents are pentaerythritol tetrastearate (PETS) or glycerol monostearate (GMS).

The organic infrared absorbers, ultraviolet absorber and other additives may be introduced into the individual layers of the layer system according to the invention by known methods such as compounding, incorporation in solution, coextrusion, kneading, incorporation during injection molding or as a masterbatch.

The layer system according to the invention may be prepared by known methods such as coating, coextrusion, hot pressing, dipping, bonding, pressing, UV or thermal curing, laminating, multi-component injection molding, application from solution, back injection or the like in one or more and optionally different steps.

The molded articles thus obtained may be brought to the desired shape before or after coating by likewise known methods such as thermoforming.

The skilled person is familiar with the measures for the preparation of the transparent thermoplastics.

The individual layers may be applied to one another at the same time as or immediately after forming of the basic article, e.g. by coextrusion or multi-component injection molding. Application may also, however, take place onto the finished formed basic article, e.g., by lamination with a film or by coating with a solution.

Layer (A) is prepared preferably by coating, layer (B) by injection molding and layer (C) by hot laminating or back injection with layer (B). According to a further preferred embodiment of the invention, layers (A) and (B) are prepared by coextrusion.

Layer (C) may be glued onto layer (B).

Adhesives used for layer (C) may be any adhesives known to the skilled person for bonding plastics, for example, those based on polyurethane and/or acrylate. The use of solvent-free and completely transparent adhesives is preferred.

The layer systems according to the invention may find general application wherever heat transmission is undesirable. The use for automotive components is particularly suitable, e.g., glazing elements, car sunroofs, plastic headlamp diffusers and architectural applications such as building glazing, greenhouse components, conservatories, bus shelters or similar applications. Twin-wall sheets or multiwall sheets may also be used. Moreover, the use for injection molded parts such as food containers, components of electrical devices and in spectacle lenses, e.g. for goggles such as welding goggles, is possible.

The layer system according to the invention is suitable for the manufacture of molded articles, particularly for the manufacture of transparent plastics glazing elements such as, e.g., plastics glazing elements based on polycarbonate and/or copolycarbonate. The invention also provides, therefore, molded articles manufactured with the layer system according to the invention.

The invention is further illustrated but is not intended to be limited by the following examples in which all parts and percentages re by weight unless otherwise specified.

EXAMPLES

Preparation of Test Specimens

In order to prepare test specimens, an additive-free, unstabilised homopolycarbonate based on bisphenol A (Makrolon® 2808 and Makrolon® 3108 from Bayer AG, Leverkusen) with an average molecular weight of about 28,000 and 30,000 respectively ($M_w$ by GPC) was compounded at 300° C. in a twin-shaft extruder with the amount of additive given in Table 1 and then granulated. Colored test sheets were then injection molded from these granules (76 mm×50 mm×2.5 mm (layer B)).

The following compounds were used as IR absorbers:

| | |
|---|---|
| IR absorber (A): | Vanadyl-5,14,23,32-tetraphenyl-2,3-naphthalocyanine (Aldrich, Steinheim, Germany), and |
| IR absorber (B): | Copper (II)-1,4,8,11,15,18,22,25-octabutoxy-29H,31H-phthalocyanine (Aldrich, Steinheim, Germany). |

The UV absorbers used were 2-(2'-hydroxy-3'-(2-butyl)-5' (tert.-butyl)-phenyl)-benzotriazene (Tinuvin® 350 and Bis-(3-(2H-benztriazolyl)-2-hydroxy-5-tert.-octyl)methane (Tinuvin® 360) from Ciba Spezialitätenchemie Basel, Switzerland).

TABLE 1

Composition of the specimens

| Specimen | |
|---|---|
| 1 | Layer (A): 7% Tinuvin ® 360 in Makrolon ® 3108<br>Layer (B): 70 ppm IR absorber (A) + 0.3% UV absorber in Makrolon ® 2808<br>Layer (C): 3M ® Solar Reflecting Film N-NPE 1458LP |
| 2 | Layer (A): 7% Tinuvin ® 360 in Makrolon ® 3108<br>Layer (B): 70 ppm IR absorber (B) + 0.3% Tinuvin ® 360 in Makrolon ® 2808<br>Layer (C): 3M ® Solar Reflecting Film N-NPE 1458LP |

The colored test sheets were then bonded with a 50 μm to 70 μm thick polycarbonate film composed of 7% bis-(3-(2H-benztriazolyl)-2-hydroxy-5-tert.-octyl)methane, (Tinuvin® Ciba Sperialitätenchemie, Basel) in Makrolon® 3108 (thermoplastic).

The colored test sheets thus coated were then bonded on the side of layer (B) with a reflecting film of the "Solar Reflecting Film, N-NPE 1458LP" type (3M®, St. Paul, USA), such that a layer system with the following layer structure was obtained:

layer (A)-layer (B)-layer (C)

The adhesive used was an adhesive of the Helmitin 35050 type (Forbo Helmitin, Pirmasens, Del.).

Transmission Properties

The transmission spectra of specimens 1 and 2 were measured with a "lamda 9" UV-VIS-NIR spectrometer from Perkin Elmer in the range from 300 nm to 2,500 nm. From this the LTA and TDS values were determined in accordance with SAE J 1796 (May 1995 edition).

TABLE 2

| Specimen | LTA [%] | TDS [%] |
|---|---|---|
| 1 | 75.8 | 44.1 |
| 2 | 70.7 | 40.0 |

The test results show that the layer systems according to the invention, in a simple structure, have good transparency (LTA value >70) and at the same time efficient thermal insulation (TDS value <50). A particularly balanced ratio of LTA to TDS value is obtained by the use of the IR absorber vanadyl-5,14,23,32-tetraphenyl-2,3-naphthalocyanine in the layer structure according to the invention (specimen 1). In addition, the layer systems according to the invention have excellent long-term weathering stability. Even after Xe-WOM weathering of 3,000 hours, the layer systems according to the invention are characterized by excellent transparency and outstanding gloss values.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A heat-absorbing system comprising at least a first layer (A) containing a ultraviolet absorber, a second layer (B) containing an organic infrared absorber and ultraviolet absorber and a third, interference layer (C) reflecting in the infrared range.

2. The system according to claim 1 wherein the interference layer (C) contains at least two transparent layers (C1) and (C2) having refractive indices that differ one from the other.

3. The system according to claim 2 wherein the layer (C) comprises a multiplicity of alternating layers (C1) and (C2).

4. The system according to claim 3 wherein (C1) contains a thermoplastic material that differs from (C2).

5. The system according to claim 1, characterized in that layer (C) contains metal layer, metal oxide layer, metal nitride layer and oxinitride metal layer.

6. The system according to claim 1 wherein each of layer (A) and layer (B) have a thickness of 1 μm to 100 μm.

7. The system of claim 1 wherein the layer (C) has a thickness of 0.1 μm to 200 μm.

8. The system of claim 1 further containing substrate (S) comprising glass or a transparent thermoplastic polymer, said substrate having a thickness of 1 mm to 30 mm.

9. The system according to claim 1 wherein the infrared absorber is a member selected from the group consisting of phthalocyanines, naphthalocyanines and perylenes.

10. The system according to claim 1 wherein the ultraviolet absorber is a member selected from the group consisting of hydroxybenzotriazoles, hydroxytriazines, hydroxybenzophenones and arylated cyanoacrylates.

11. The system according to claim 1 wherein layer (A) and layer (B) are based on a member selected from the group consisting of polymer and lacquer.

12. The system according to claim 11 wherein the polymer is a transparent thermoplastic.

13. The system according to claim 1 wherein the individual layers are arranged as layer (A)-layer (B)-layer (C) or layer (A)-layer (C)-layer (B).

14. The system according to claim 13 wherein the layer (A) is lacquer or polymer and layer (B) is a polymer layer.

15. The system according to claim 8 wherein the transparent thermoplastic polymer is a member selected from the group consisting of polycarbonate and polyestercarbonate.

16. The system according to claim 8 wherein the individual layers are arranged as layer (A)-layer (B)-substrate (S)-layer (C) or layer (A)-substrate (S)-layer (B)-layer (C) or layer (A)-substrate (S)-layer (C)-layer (B).

17. A process for preparing the system of claim 1 comprising preparing layer (A) as a coating and making layer (B) by injection molding and hot laminating or back-injection molding of layer (C).

18. A process for preparing the system of claim 1 comprising coextruding layer (A) and layer (B).

19. A molded article comprising the system of claim 1.

20. A method of using the system of claim 1 comprising shielding plastics glazing elements from heat radiation.

* * * * *